(12) United States Patent
Brown et al.

(10) Patent No.: US 7,031,798 B2
(45) Date of Patent: Apr. 18, 2006

(54) EVENT MANAGEMENT SYSTEMS AND METHODS FOR THE DISTRIBUTION OF MOTION CONTROL COMMANDS

(75) Inventors: David W. Brown, Bingen, WA (US); Skylar Stein, Bingen, WA (US)

(73) Assignee: Roy-G-Biv Corporation, Bingen, WA (US)

( * ) Notice: Subject to any disclaimer, the term of this patent is extended or adjusted under 35 U.S.C. 154(b) by 275 days.

(21) Appl. No.: 10/074,577

(22) Filed: Feb. 11, 2002

(65) Prior Publication Data

US 2002/0165627 A1   Nov. 7, 2002

Related U.S. Application Data

(60) Provisional application No. 60/267,645, filed on Feb. 9, 2001.

(51) Int. Cl.
*G06F 19/00*   (2006.01)

(52) U.S. Cl. .................. 700/174; 700/245

(58) Field of Classification Search ........ 700/8–10, 700/17–20, 28–31, 44, 45, 47, 83, 159, 169, 700/173–180, 195, 245, 250–257, 264, 170
See application file for complete search history.

(56) References Cited

U.S. PATENT DOCUMENTS

| | | |
|---|---|---|
| 4,159,417 A | 6/1979 | Rubincam .................. 235/375 |
| 4,199,814 A | 4/1980 | Rapp et al. |
| 4,418,381 A | 11/1983 | Molusis et al. .................. 700/2 |
| 4,531,182 A | 7/1985 | Hyatt .............................. 700/2 |
| 4,688,195 A | 8/1987 | Thompson et al. |
| 4,713,808 A | 12/1987 | Gaskill et al. ............... 370/314 |
| 4,767,334 A | 8/1988 | Thorne et al. ................. 434/29 |
| 4,769,771 A | 9/1988 | Lippmann et al. |
| 4,782,444 A | 11/1988 | Munshi et al. |
| 4,800,521 A * | 1/1989 | Carter et al. ................. 718/102 |
| 4,809,335 A | 2/1989 | Rumsey ...................... 704/266 |
| 4,815,011 A | 3/1989 | Mizuno et al. |
| 4,840,602 A | 6/1989 | Rose ........................... 446/175 |
| 4,846,693 A | 7/1989 | Baer ........................... 434/308 |

(Continued)

FOREIGN PATENT DOCUMENTS

EP     0442676 A2    8/1991

(Continued)

OTHER PUBLICATIONS

Sue Chen, Jonathon Lin; "Computer Numerical Control: Essentials in Programming and Networking"; Part 5, Chapter 27; pp. 824-848, No Date.

(Continued)

*Primary Examiner*—Maria N. Von Buhr
(74) *Attorney, Agent, or Firm*—Michael R. Schacht; Schacht Law Office, Inc.

(57) ABSTRACT

A motion control system for controlling a target device to perform a desired motion operation. The motion control system comprises at least one motion event provider, a motion event manager, and a motion control component. The motion event provider is configured to generate at least one event token upon the occurrence of at least one predetermined event. The event token is associated with at least one motion command. The motion event manager receives the at least one event token. The motion control component is adapted to transmit to the target device a control command based on the at least one motion command associated with the event token received by the motion event manager.

16 Claims, 6 Drawing Sheets

U.S. PATENT DOCUMENTS

| | | | |
|---|---|---|---|
| 4,855,725 A | 8/1989 | Fernandez | 345/173 |
| 4,857,030 A | 8/1989 | Rose | 446/303 |
| 4,887,966 A | 12/1989 | Gellerman | 463/38 |
| 4,897,835 A | 1/1990 | Gaskill et al. | 370/314 |
| 4,912,650 A | 3/1990 | Tanaka et al. | |
| 4,923,428 A | 5/1990 | Curran | |
| 4,937,737 A | 6/1990 | Schwane et al. | 719/310 |
| 4,987,537 A | 1/1991 | Kawata | |
| 5,005,135 A | 4/1991 | Morser et al. | |
| 5,020,021 A | 5/1991 | Kaji et al. | |
| 5,095,445 A | 3/1992 | Sekiguchi | 709/246 |
| 5,120,065 A | 6/1992 | Driscoll et al. | 273/237 |
| 5,126,932 A | 6/1992 | Wolfson et al. | 709/202 |
| 5,168,441 A | 12/1992 | Onarheim et al. | 700/17 |
| 5,175,684 A | 12/1992 | Chong | |
| 5,175,817 A | 12/1992 | Adams et al. | 709/236 |
| 5,175,856 A | 12/1992 | Van Dyke et al. | |
| 5,245,703 A | 9/1993 | Hubert | 710/105 |
| 5,247,650 A | 9/1993 | Judd et al. | 703/20 |
| 5,377,258 A | 12/1994 | Bro | 379/106.02 |
| 5,390,304 A | 2/1995 | Leach et al. | |
| 5,390,330 A | 2/1995 | Talati | 717/104 |
| 5,392,207 A | 2/1995 | Wilson et al. | 700/64 |
| 5,402,518 A | 3/1995 | Lowery | 704/201 |
| 5,412,757 A | 5/1995 | Endo | 706/52 |
| 5,438,529 A | 8/1995 | Rosenberg et al. | 708/131 |
| 5,450,079 A | 9/1995 | Dunaway | 341/23 |
| 5,453,933 A | 9/1995 | Wright et al. | 700/181 |
| 5,465,215 A | 11/1995 | Strickland et al. | 700/180 |
| 5,491,813 A | 2/1996 | Bondy et al. | 719/323 |
| 5,493,281 A | 2/1996 | Owens | 340/825.24 |
| 5,511,147 A | 4/1996 | Abdel-Malek | |
| 5,541,838 A | 7/1996 | Koyama et al. | |
| 5,576,727 A | 11/1996 | Rosenberg et al. | 345/179 |
| 5,596,994 A | 1/1997 | Bro | 600/545 |
| 5,600,373 A | 2/1997 | Chui et al. | 375/240.1 |
| 5,604,843 A | 2/1997 | Shaw et al. | 358/1.1 |
| 5,607,336 A | 3/1997 | Lebensfeld et al. | 446/297 |
| 5,608,894 A | 3/1997 | Kawakami et al. | 717/162 |
| 5,617,528 A | 4/1997 | Stechmann et al. | 715/517 |
| 5,623,582 A | 4/1997 | Rosenberg | 700/264 |
| 5,625,821 A * | 4/1997 | Record et al. | 718/100 |
| 5,636,994 A | 6/1997 | Tong | 434/308 |
| 5,652,866 A | 7/1997 | Aldred et al. | 703/23 |
| 5,655,945 A | 8/1997 | Jani | 446/175 |
| 5,666,161 A | 9/1997 | Kohiyama et al. | 375/240.18 |
| 5,670,992 A | 9/1997 | Yasuhara et al. | 345/173 |
| 5,691,897 A | 11/1997 | Brown et al. | 700/56 |
| 5,691,898 A | 11/1997 | Rosenberg et al. | 700/85 |
| 5,701,140 A | 12/1997 | Rosenberg et al. | 345/156 |
| 5,707,289 A | 1/1998 | Watanabe et al. | 463/40 |
| 5,724,074 A | 3/1998 | Chainani et al. | |
| 5,733,131 A | 3/1998 | Park | 434/307 R |
| 5,734,373 A | 3/1998 | Rosenberg et al. | 345/161 |
| 5,737,523 A | 4/1998 | Callaghan et al. | 713/201 |
| 5,739,811 A | 4/1998 | Rosenberg et al. | 345/161 |
| 5,746,602 A | 5/1998 | Kikinis | 434/169 |
| 5,752,880 A | 5/1998 | Gabai et al. | 463/1 |
| 5,754,855 A * | 5/1998 | Miller et al. | 718/106 |
| 5,764,155 A | 6/1998 | Kertesz et al. | 700/295 |
| 5,790,178 A | 8/1998 | Shibata et al. | 348/14.07 |
| 5,800,268 A | 9/1998 | Molnick | 463/40 |
| 5,801,946 A | 9/1998 | Nissen et al. | 700/95 |
| 5,805,785 A * | 9/1998 | Dias et al. | 714/4 |
| 5,818,537 A | 10/1998 | Enokida et al. | 348/441 |
| 5,821,920 A | 10/1998 | Rosenberg et al. | 345/156 |
| 5,821,987 A | 10/1998 | Larson | 348/14.15 |
| 5,822,207 A | 10/1998 | Hazama et al. | 700/97 |
| 5,825,308 A | 10/1998 | Rosenberg | 341/20 |
| 5,828,575 A | 10/1998 | Sakai | 700/182 |
| 5,846,132 A | 12/1998 | Junkin | 463/42 |
| 5,848,415 A | 12/1998 | Guck | 707/10 |
| 5,852,441 A | 12/1998 | Nakajima et al. | 345/866 |
| 5,855,483 A | 1/1999 | Collins et al. | 434/322 |
| 5,867,385 A | 2/1999 | Brown et al. | 700/56 |
| 5,873,765 A | 2/1999 | Rifkin et al. | 446/301 |
| 5,889,670 A | 3/1999 | Schuler et al. | 700/83 |
| 5,889,672 A | 3/1999 | Schuler et al. | 700/83 |
| 5,890,963 A | 4/1999 | Yen | 463/42 |
| 5,907,704 A | 5/1999 | Gudmundson et al. | 717/100 |
| 5,907,831 A | 5/1999 | Lotvin et al. | 705/14 |
| 5,914,876 A | 6/1999 | Hirai | 700/87 |
| 5,920,476 A | 7/1999 | Hennessey et al. | 700/17 |
| 5,924,013 A | 7/1999 | Guido et al. | 725/67 |
| 5,956,484 A | 9/1999 | Rosenberg et al. | 709/203 |
| 5,959,613 A | 9/1999 | Rosenberg et al. | 345/161 |
| 5,960,085 A | 9/1999 | De La Huerga | 340/5.61 |
| 5,977,951 A | 11/1999 | Danieli et al. | 345/156 |
| 6,012,961 A | 1/2000 | Sharpe et al. | |
| 6,020,876 A | 2/2000 | Rosenberg et al. | 345/157 |
| 6,028,593 A | 2/2000 | Rosenberg et al. | 345/156 |
| 6,031,973 A * | 2/2000 | Gomi et al. | 700/245 |
| 6,038,603 A | 3/2000 | Joseph | 709/228 |
| 6,046,727 A | 4/2000 | Rosenberg et al. | 345/156 |
| 6,057,828 A | 5/2000 | Rosenberg et al. | 345/156 |
| 6,061,004 A | 5/2000 | Rosenberg | 341/28 |
| 6,070,010 A | 5/2000 | Keenleyside et al. | |
| 6,078,308 A | 6/2000 | Rosenberg et al. | 345/856 |
| 6,078,968 A | 6/2000 | Lo et al. | 710/5 |
| 6,083,104 A | 7/2000 | Choi | |
| 6,090,156 A | 7/2000 | MacLeod | |
| 6,100,874 A | 8/2000 | Schena et al. | 345/157 |
| 6,101,425 A | 8/2000 | Govindaraj et al. | 700/181 |
| 6,101,530 A | 8/2000 | Rosenberg et al. | 709/203 |
| 6,104,158 A | 8/2000 | Jacobus et al. | 318/568.11 |
| 6,125,385 A | 9/2000 | Wies et al. | 709/203 |
| 6,128,006 A | 10/2000 | Rosenberg et al. | 345/163 |
| 6,131,097 A | 10/2000 | Peurach et al. | 707/102 |
| 6,139,177 A | 10/2000 | Venkatraman et al. | 700/83 |
| 6,144,895 A | 11/2000 | Govindaraj et al. | 700/181 |
| 6,147,647 A | 11/2000 | Tassoudji et al. | 343/700 MS |
| 6,161,126 A | 12/2000 | Wies et al. | 709/203 |
| 6,166,723 A | 12/2000 | Schena et al. | 345/184 |
| 6,169,540 B1 | 1/2001 | Rosenberg et al. | 345/701 |
| 6,173,316 B1 | 1/2001 | De Boor et al. | 709/218 |
| 6,191,774 B1 | 2/2001 | Schena et al. | 345/163 |
| 6,195,592 B1 | 2/2001 | Schuler et al. | 700/83 |
| 6,209,037 B1 | 3/2001 | Brown et al. | 709/230 |
| 6,216,173 B1 | 4/2001 | Jones et al. | 345/705 |
| 6,219,032 B1 | 4/2001 | Rosenberg et al. | 345/157 |
| 6,219,033 B1 | 4/2001 | Rosenberg et al. | 345/157 |
| 6,232,891 B1 | 5/2001 | Rosenberg | 341/20 |
| 6,233,545 B1 | 5/2001 | Datig | |
| 6,243,078 B1 | 6/2001 | Rosenberg | 341/20 |
| 6,246,390 B1 | 6/2001 | Rosenberg | 345/156 |
| 6,252,579 B1 | 6/2001 | Rosenberg et al. | 345/856 |
| 6,252,853 B1 | 6/2001 | Ohno | 370/242 |
| 6,259,382 B1 | 6/2001 | Rosenberg | 341/20 |
| 6,271,833 B1 | 8/2001 | Rosenberg et al. | 345/156 |
| 6,278,439 B1 | 8/2001 | Rosenberg et al. | 345/157 |
| 6,285,351 B1 | 9/2001 | Chang et al. | 345/156 |
| 6,288,705 B1 | 9/2001 | Rosenberg et al. | 345/163 |
| 6,290,565 B1 | 9/2001 | Galyean III et al. | |
| 6,292,170 B1 | 9/2001 | Chang et al. | 345/156 |
| 6,292,174 B1 | 9/2001 | Mallett et al. | 345/163 |
| 6,292,712 B1 | 9/2001 | Bullen | 700/245 |
| 6,292,714 B1 | 9/2001 | Okabayashi | 700/245 |
| 6,295,530 B1 | 9/2001 | Ritchie et al. | |
| 6,300,936 B1 | 10/2001 | Braun et al. | 345/156 |
| 6,300,937 B1 | 10/2001 | Rosenberg | 345/156 |
| 6,301,634 B1 * | 10/2001 | Gomi et al. | 710/267 |
| 6,304,091 B1 | 10/2001 | Shahoian et al. | 324/662 |
| 6,309,275 B1 | 10/2001 | Fong et al. | |
| 6,310,605 B1 | 10/2001 | Rosenberg et al. | 345/157 |

| | | | |
|---|---|---|---|
| 6,317,116 B1 | 11/2001 | Rosenberg et al. | 345/701 |
| 6,317,871 B1 | 11/2001 | Andrews et al. | |
| 6,343,349 B1 | 1/2002 | Braun et al. | 711/154 |
| 6,400,996 B1 | 6/2002 | Hoffberg et al. | |
| 6,425,118 B1 | 7/2002 | Molloy et al. | |
| 6,442,451 B1* | 8/2002 | Lapham | 700/245 |
| 6,288,716 B1 | 9/2002 | Humpleman | |
| 6,463,404 B1 | 10/2002 | Appleby | |
| 6,497,606 B1 | 12/2002 | Fong et al. | |
| 6,519,594 B1 | 2/2003 | Li | |
| 6,523,171 B1 | 2/2003 | Dupuy et al. | |
| 6,528,963 B1 | 3/2003 | Hong | |
| 6,546,436 B1 | 4/2003 | Fainmesser et al. | |
| 6,571,141 B1 | 5/2003 | Brown | |
| 6,652,378 B1 | 11/2003 | Cannon et al. | |
| 6,658,627 B1 | 12/2003 | Gallup et al. | |
| 6,662,361 B1 | 12/2003 | Jackson | |
| 6,665,688 B1 | 12/2003 | Callahan et al. | |
| 6,678,713 B1* | 1/2004 | Mason et al. | 718/102 |
| 6,778,949 B1 | 8/2004 | Duan et al. | |
| 2001/0020944 A1 | 9/2001 | Brown et al. | 345/474 |
| 2001/0029443 A1 | 10/2001 | Miyahira | |
| 2001/0032268 A1 | 10/2001 | Brown et al. | 709/230 |
| 2001/0037492 A1 | 11/2001 | Holzmann | |
| 2002/0165708 A1 | 11/2002 | Kumhyr | |
| 2002/0177453 A1 | 11/2002 | Chen et al. | |
| 2003/0033150 A1 | 2/2003 | Balan et al. | |
| 2003/0061023 A1 | 3/2003 | Menezes et al. | |
| 2003/0069998 A1 | 4/2003 | Brown et al. | |
| 2004/0025150 A1 | 2/2004 | Heishi et al. | |

FOREIGN PATENT DOCUMENTS

| | | |
|---|---|---|
| EP | 0 281 427 B1 | 8/1992 |
| EP | 0508912 A1 | 10/1992 |
| EP | 0 583 908 A2 | 2/1994 |
| EP | 821522 A2 | 1/1998 |
| EP | 0275826 A1 | 7/1998 |
| GB | 2 224 896 A | 12/1991 |
| JP | 59 228473 A | 6/1983 |
| JP | 8161335 A | 6/1996 |
| JP | 2000020114 A | 1/2000 |
| WO | WO 92/11731 A2 | 7/1992 |
| WO | WO 93/08654 A1 | 4/1993 |
| WO | WO 95/07504 A1 | 3/1995 |

OTHER PUBLICATIONS

Pritschow et al.; "Open System Controllers: Challenge for the Future of the Machine Tool Industry"; pub. Jan. 15, 1993; pp. 449-452.
William E. Ford; "What Is an Open Architecture Robot Controller" pub. Aug. 16, 1994; pp. 27-32.
Marcos et al.; "A New Solution for Integrating Control Devices Involved in Computer-Integrated Manufacturing"; pub. Sep. 2, 1996; pp. 485-490.
Chu and Wang; "Development of a Practical SFC System for CNC Machine Shop"; pub. 1994; pp. 362-367.
MICROSOFT; "The Microsoft Object Technology Strategy"; pub. Mar. 1994; pp. 1-33.
MICROSOFT; "Open Systems: Technology, Leadership, and Collaboration"; pub. Mar. 1994; pp. 1-15.
MICROSOFT; Microsoft OLE Today and Tomorrow: Technology Overview; pub. Dec. 1993; pp. 1-9.
MICROSOFT; "Object Linking and Embedding 2.0 Backgrounder"; pub. Sep. 1993; pp. 1-15.
Robert Anderson; "SMART: A Modular Architecture for Robotics and Teleoperation"; pub. 1993; pp. 416-421.
Proctor et al.; "Validation of Standard Interfaces from a Machine Control"; pub. 1996; pp. 659-664.
Altintas et al.; "Design and Analysis of a Modular CNC System"; pub. Mar. 4, 1990; pp. 305-316.
Wright et al.; "Open Architecture Manufacturing: The Impact of Open-System Computers on Self-sustaining Machinery and the Machine Tool Industry"; pp. 41-47, No Date.
Protoctor et al.; "Open Architecture Controllers"; pub. Jun. 1997; pp. 60-64.
Lutz et al.; "OSACA-The Vendor-Neutral Control Architecture"; pub. Dec. 1997; pp. 247-256.
Morales et al.; "A Generalised Software Control System for Industrial Robots"; pub. 1998; pp. 411-416.
Feng et al.; "Distributed Control of a Multiple-Tethered Mobile Robot System for Highway Maintenance and Construction"; pub Nov. 1997; pp. 383-392.
Fedrowitz; "IRL-Based Expansion of the Commonly Used High-Level Language C for Robot Programming:" pub. Oct. 1995; 5 pages.
Szabo et al.; "Validation Results of Specifications for Motion Control Interoperability"; pub. 1997; pp. 166-167.
Chang et al.; "Development and Implementation of an Application Programming Interface for PC/DSP-based Motion Control System"; pub. 1998; pp. 94-105.
Erol et al.; "Open System Architecture Modular Tool Kit for Motion and Machine Control"; pub. Sep. 2000; pp. 281-291.
Mizukawa et al.; "OriN: Open Robot Interface for the Network: A Proposed Standard"; pub. May 2000; pp. 344-350.
Michaloski et al.; "A Framework for Component-base CNC Machines" pub. Nov. 1998; pp. 132-143.
Bouzouia et al.; "A Three-layer Workcell Control Architecture Design"; pub. May 1998; pp. 1185-1191.
Morales et al.; "GENERIS: The EC-JRC Generalized Software Control System for Industrial Robots"; pub. 1999; pp. 26-33.
Muir et al.; "Mechatronic Objects for Real-time Control Software Development"; pub. Nov. 1998; pp. 251-265.
Cho et al.; "A Compact/Open Network-based Controller Incorporating Modular Software Architecture for a Humanoid Robot"; pub. 1999; pp. 341-355.
Ge et al.; "A One-stop Solution in Robotic Control System Design"; pub. Sep. 2000; pp. 42-55.
McGraw et al.; "A Friendly Command, Control, and Information System for Astronomy"; pub. 1996; pp. 356-367.
Jackman; "Robotic Control Using Sequential Function Charts"; pub. 1996; pp. 120-128.
Mizukawa et al.; "De-facto Standard API for Open and Networked Industrial Robots"; pub. Oct. 1999; pp. 455-462.
Leu et al.; "A Telemanufacturing Workcell over the Internet"; pub. Nov. 1998; pp. 230-237.
Natale et al.; "Robust Hybrid Force/Position Control with Experiments on an Industrial Robot"; pub. Sep. 19, 1999; pp. 956-961.
Nilsson et al.; "Integrated Architecture for Industrial Robot Programming and Control"; pub. Dec. 31, 1999; pp. 205-226.
Valera et al.; "Interactive Online Evaluation of Robot Motion Control"; pub. Aug. 22, 1999; pp. 1039-1043.
"NEMI Low-cost Controller Project"; pub. Dec. 1996; total pages 392.
Sperling; "Designing Applications for an OSACA Control"; pub. Nov. 16, 1997; 5 pages.
Lutz et al.; "OSACA: The Vendor-neutral Control Architecture"; pub. 1997; 10 pages.

Sperling et al.; "Enabling Open Control Systems: An Introduction to the OSACA System Platform"; pub. May 1996; pp. 1-8.

"Requirements of Open Modular Architecture Controllers for Applications in the Automotive Industry"; pub. Dec. 13, 1994; pp. 1-13.

Open, Modular Architecture Controls at GM Powertrain; pub. May 14, 1996; pp. 1-33.

Proctor et al.; "Validation of Standard Interfaces for Machine Control"; pub. Dec. 6, 2000; pp. 1-7.

"Technologies Enabling Agile Manufacturing (TEAM) Intelligent Closed Loop Processing"; pub. Jan. 11, 1996; 30 pages.

Bradley Bargen and Peter Donnely; *Inside Direct X—In Depth Techniques for Developing High-Performance Multimedia Applications*; 1988; Chps. 1, 18-20, 22-27; Microsoft Press; U.S.

Peter Kovach; *Inside Direct3D—The Definitive Guide for Real-Time 3D Power and Performance for Microsoft Windows*; 2000; Chps. 1, 7, 15; Microsoft Press; U.S.

M. Farsi and M. Barbosa; *CANopen Implementation—Applications to Industrial Network*; 2000; Research Studies Press Ltd.; England and U.S.

Wolfhard Lawrenz; *CAN System Engineering—From Theory to Practical Applications*; 1997; Springer-Verlag New York, Inc.; U.S.

Allen-Bradley; "CNCnet Software Library"; Oct., 1992; Publication 8000-6.1.1; U.S.

Robert Bosch GmbH; "CAN Specification"; Sep., 1991; Version 2.0.

SISCO, Inc.; "Overview and Introduction to the Manufacturing Message Specification (MMS)"; 1994-1995; Revision 2; Systems Integration Specialists Company, Inc.; Sterling Heights, Michigan, U.S.

ISO-9506-1 "Industrial Automation Systems—Manufacturing Message Specification—Part 1: Service definition"; Aug., 2000; pp. i-22; ISO/IEC; Switzerland.

ISO-9506-2 "Industrial Automation Systems—Manufacturing Message Specification—Part 2: Protocol specification"; Aug. 2000; pp. i.-6; ISO/IEC; Switzerland.

SISCO Inc.; "MMS-EASE"; Jan. 1996; Systems Integration Specialists Company, Inc.; Sterling Heights, Michigan, U.S.

ANSI/EIA-484-A "Electrical and Mechanical Interface Characteristics and Line Control Protocol Using Communication Control Characters for Serial Data Link Between a Direct Numerical Control System and Numerical Control Equipment Employing Asynchronous Full Duplex Transmission"; Jun., 1995; Electronic Industries Association; U.S.

ISO/IEC 7498-1 "Information Technology—Open Systems Interconnection-Basic Reference Model: The Basic Model"; Nov. 1994; U.S.

ISO/IEC 7498-3 "Information Technology—Open Systems Interconnection-Basic Reference Model: Naming and Addressing"; Apr. 1997; U.S.

Todd J. Schuett; "The Benefits and Data Bottlenecks of High Speed Milling"; Aug., 1995; conference paper presented at Southeastern Michigan Chapter American Mold Builders Association; Creative Technology Corporation; U.S.

Todd J. Schuett; "The Ultimate DNC; Direct CNC Networking (DCN)"; *Modern Machine Shop*; Jan., 1996; Creative Technology Corporation; U.S.

Todd J. Schuett; "Advanced Controls for High Speed Milling"; conference paper presented at the SME "High Speed Machining" conference; May 7-8, 1996; Creative Technology Corporation; U.S.

Leitao, Machado & Lopes; "A Manufacturing Cell Integration Solution"; paper developed at CCP as a part of the ESPRIT 5629 Project; Oct., 1995.

Mitsubishi Electric; *Mitsubishi Electric Advance: Programmable Logic Controllers Edition*; Sep., 1996; vol. 76; Mitsubishi Electric Corporation; Tokyo.

Farsi, M.; "Flexible and Reliable Robotics Cells in Factory Automation"; 1993; pp. 520-525.

Chu & Wang; "Development of a Practical SFC System for CNC Machine Shop"; *International Conference on Data and Knowledge Systems for Manufacturing and Engineering*; May 1994; pp. 362-367, vol. 1; pp. xx+745, vol. 2.; Chinese Univ.; Hong Kong.

Farsi, M.; "Device Communication for Flexible Manufacturing:-A New Concept"; 1994; pp. 328-334.

Farsi, M.; "A Production Cell Communication Model in Factory Automation Using the Controller Area Network"; 1995; pp. 90-95.

Farsi, M. "CANopen: The Open Communications Solution"; 1996;pp. 112-116.

Katayama et al.; "A Motion Control System with Event-driven Motion-module Switching Mechanism for Robotic Manipulators"; *IEEE International Workshop on Robot and Human Communication*; Jul., 1993; pp. 320-325; U.S.

Matsui et al.; "An Event-Driven Architecture for Controlling Behaviors of the Office Conversant Mobile Robot, *Jijo-2*"; *Proceedings of the 1997 IEEE International Conference on Robotics and Automation*; Apr. 1997; pp. 3367-3372; U.S.

Microsoft Corporation; "How to Write and Use ActiveX Controls for Microsoft Windows CE 3.0"; *Windows CE 3.0 Technical Articles*; Jun., 2000; pp. 1-5.

Microsoft Corporation; "Notes on Implementing an OLE Control Container"; *ActiveX Controls Technical Articles*; Sep. 21, 1994; pp. 1-47.

Microsoft Corporation; "What OLE Is Really About"; *OLE (General) Technical Articles*; Jul., 1996; pp. 1-33.

Microsoft Corporation; "Categorizing by Component Capabilities"; *Platform SDK: COM*; Nov., 2001; pp. 1-23.

Microsoft Corporation; "Dynamic Data Exchange"; *Windows 3.1 SDK Guide to Programming*; 1992, 1993; Chapter 22; 21 pages.

Microsoft Corporation; "Dynamic Data Exchange Management Library"; *Win32 SDK: Prog. Ref.* vol. 2; 1992, 1993; Chapter 77; 26 pages.

Microsoft Corporation; "Network Dynamic Data Exchange"; *Windows for Workgroups 3.1 Resource Kit*; 1992, 1993; Chapter 11; 19 pages.

WOSA Backgrounder: Delivering Enterprise Services to the Windows-based Desktop, Jul. 1993, Microsoft Development Library; pp. 1-19.

WOSA Inside Windows 95; pp. 348-351, no date.

Software Products for Industrial Automation, ICONICS; 6 pages, no date.

WEB 3.0 Product Brochure, Trihedral Engineering Ltd. (1994); 6 pages.

The Complete, Computer-Based Automation Tool (IGSS) Seven Technologies A/S; 6 pages no date.

Oregon Micro Systems Product Guide: pp. 1-20, no date.
AIMAX-WIN Product Brochure, TA Engineering Co., Inc.; 8 pages, no date.
XANALOG Model NL-SIM Product Brochure, XANALOG, 4 pages, no date.
ExperTune PID Tuning Software, Gerry Engineering Software; 6 pages, no date.
PMAC Product Catalog, p. 43, no date.
Paragon TNT Product Brochure, Intec Controls Corp.; 6 pages, no date.
Aerotech Motion Control Product Guide; pp. 233-234, no date.
OpenBatch Product Brief, PID, Inc.; 6 pages, no date.
PC/DSP-Series Motion Controller C Programming Guide; pp. 1-54, no date.
FLX Product Brochure, Intellution (1994); 6 pages.
Precision Motion Controls Product Guide; p. 17, no date.
Compumotor Digiplan (1993-94) Catalog pp. 10-11.

* cited by examiner

EVENT MANAGEMENT SYSTEMS AND METHODS FOR THE DISTRIBUTION OF MOTION CONTROL COMMANDS

RELATED APPLICATIONS

This application claims priority of U.S. Provisional Application Ser. No. 60/267,645 filed Feb. 9, 2001.

TECHNICAL FIELD

The present invention relates to motion control systems and, more specifically, to an event management system optimized for the processing and distribution of motion control commands for a motion control device.

BACKGROUND OF THE INVENTION

Electromechanical systems are used in numerous environments to translate electrical signals in mechanical movement. As examples, factory automation systems, toys, appliances, and the like all may use one or more electromechanical transducers that move in response to electrical control signals.

Typically, an application programmer familiar with a specific environment creates an application program defining a desired sequence of movements. U.S. Pat. Nos. 5,691,897, 5,867,385, and 6,209,037 to Brown et al. disclose systems and methods for generating, processing, and/or distributing control commands to one or more motion control devices based on such an application program.

The present invention may be embodied as a part of an overall motion control system as described in the Brown et al. patents and will be described herein in that context. However, as described below, the principles of the present invention may have broader application to other motion control systems and methods, and the scope of the present invention should be determined by the claims appended hereto and not the following detailed description.

SUMMARY OF THE INVENTION

A motion control system for controlling a target device to perform a desired motion operation. The motion control system comprises at least one motion event provider, a motion event manager, and a motion control component. The motion event provider is configured to generate at least one event token upon the occurrence of at least one predetermined event The event token is associated with at least one motion command. The motion event manager receives the at least one event token. The motion event manager uses the motion control component to transmit to the target device a control command based on the at least one motion command associated with the event token received by the motion event manager.

DETAILED DESCRIPTION OF THE INVENTION

Figure 1:
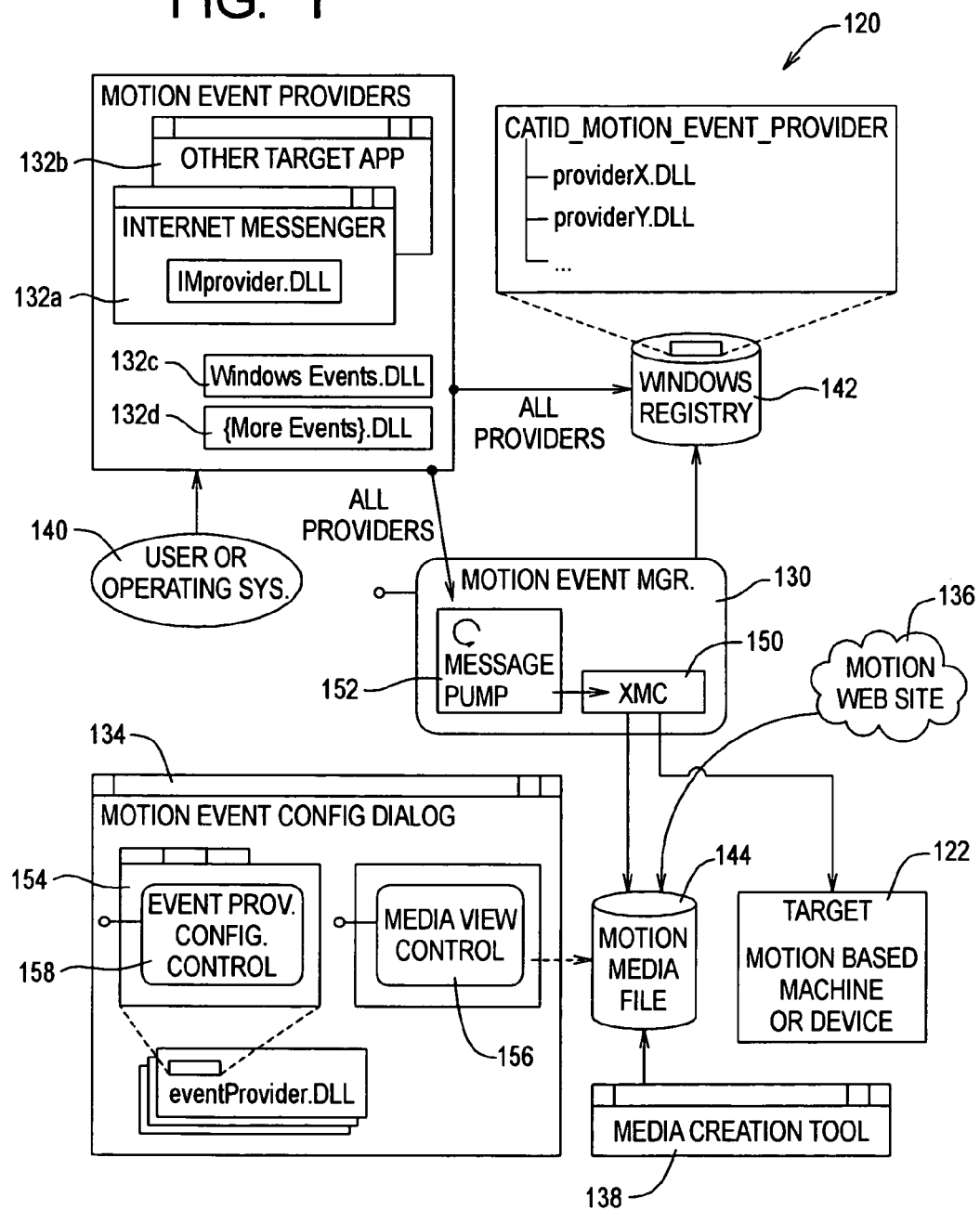
FIG. 1 is a module interaction map depicting a motion control system incorporating an event management system of the present invention.

Referring initially to FIG. 1, depicted therein is a motion control system 120 constructed in accordance with, and embodying, the principles of the present invention. The motion control system 120 is an event-based system used to control, configure, and query one or more motion based devices or machines such as indicated by reference character 122 in the drawing. The motion based devices or machines 122 will be referred to herein as the target device.

In the following discussion, the components or objects that form the motion control system 120 and the basic operation of the system 120 will first be described. After that will follow a discussion of the interaction between those objects and several detailed scenarios of typical actions of this system 120.

Referring initially to FIG. 1 of the drawing, it can be seen that the motion control system 120 comprises the motion based machine or device 122, a motion event manager 130, one or more motion event provider objects 132, a motion event interface 134, a motion web site 136, and a media creation tool 138.

The system 120 is adapted to be run on a general purpose computer platform comprising computer hardware and an operating system 140. The exemplary operating system 140 is a Windows variant and comprises a registry 142.

The web site 136 and media creation tool 138 provide access to one or more motion media files 144. The motion media files 144 contain what will be referred to herein as motion media.

The term "motion media" includes motion scripts, motion application programs, and/or individual motion instructions capable of causing the target device 122 to perform a desired motion operation comprising a discrete movement or sequence of movements.

The motion media comprises what will be referred to as motion commands. The term "motion commands" will be used herein to refer to both control commands and media commands associated with a desired motion operation. The term "control commands" as used herein refers to device-specific commands that may be directly run by a target device to obtain a desired motion operation. The term "media commands" used herein refers to machine independent instructions that generically define a desired motion operation. Normally, media commands are converted into control commands before the target device executes the desired motion operation corresponding to a particular media command or set of media commands. The term "application program" will be used to refer to a set of control and/or media commands associated with a sequence of discrete movements.

The motion event manager 130 comprises a motion control component 150 and an event handling component 152. The motion event interface 134 further comprises a event provider configuration control 154 and a media view control 156.

The motion control system 120 operates basically as follows. The motion event providers 132 generate what will be referred to as event tokens based on the occurrence of a predetermined event. The event token is associated with the predetermined event in advance and thus identifies the predetermined event. The event token may also contain additional information such as the source of the predetermined event, parameters associated with the predetermined event, and the like.

The event tokens are sent to the motion event manager 130. The motion event providers 132 and motion event manager 130 run in separate processes and could perhaps run on separate physical machines connected over a network. The motion event providers 132 and motion event manager 130 thus use the system for the inter-process communication provided by the operating system to transmit the event tokens from the event providers 132 to the motion event manager 130.

The motion event manager 130 notifies the motion control component 150 when the event token is received and the identity of the event token. The action taken by the motion control component 150 upon receipt of an event token depends upon the nature of the event token. The received event token may contain or identify a particular control command, and the motion control component 150 can simply pass that control command to the target device 122. The received event token may contain or identify a particular media command, in which case the motion control component 150 may be required to convert the media command into a control command capable of being run by the target device 122. Another event token may start, stop, or otherwise control a separate application program run by the motion control component 150.

In the exemplary system 120, the association of motion media with event tokens is preferably made by the motion event manager 130. This association is typically represented by a table, spreadsheet, or other data storage means capable of defining relationships between event tokens and motion media. Upon receipt of each event token, the motion event manager 130 will identify the motion media previously associated with the received token and send the identified motion media to the motion control component 150 for control of the target device 122.

With the foregoing understanding of the basic operation of the system 120, the details of this exemplary motion control system 120 will now be described.

The motion event manager 130 handles the creation of each event provider 132 installed on the system by creating in-proc providers or injecting other providers into their target processes. The event manager 130 also catches events fired from each provider 132 and initiates the appropriate motion request for each event. In the exemplary system 120, the event manager 130 is the only object that communicates directly with the motion control component 150, as will be described in further detail below. The exemplary event manager 130 is accessible by double clicking its icon in the Windows System Tray in a conventional manner.

The purpose of the event handling component 152 is to handle the inter-process communications between the motion event manager 130 and the motion event providers 132. The exemplary event handling component 152 is or may be a conventional software object referred to as a message pump.

The motion event provider objects 132 are individually designed to monitor user configurable events from a given source. The exemplary system 120 employs two types of motion event providers 132: simple in-proc servers 132a,b hosted by the motion event manager 130 and specialty DLLs 132c,d that are injected into a target process to monitor event cases. Each motion event provider object 132 also contains an event configuration control 154 that, as will be described below, allows a user to configure all events supported by the motion event provider objects 132. The motion event provider objects 132 notify the motion event manager 130 of each event caught by the objects 132.

The motion event manager 130 and motion control component 150 operate together to allow interaction between the motion event providers 132 and the target device 122.

The motion control component 150 may be or incorporate parts of a software system as disclosed, for example, in U.S. Pat. Nos. 5,691,897 and 5,867,385. The systems disclosed in the '897 and '385 patents are capable of generating device-specific control commands based on hardware independent media commands written to a predetermined application programming interface.

As an alternative, the motion control component 150 may act as a conduit that passes device-specific control commands and query responses between the motion event providers 132 and the target device 122. A motion control component implemented in this manner would not convert between hardware independent media commands and device specific control commands.

A preferred implementation of the motion control component 152 would be to be for the component 152 to function in both a translation mode and in a pass-through mode. In the translation mode, the component 152 converts media commands into control commands. In the pass-through mode, the component 152 simply passes control commands from the motion event providers 132 to the target devices 122. In either mode, query responses are returned from the target devices 122 to the event provider 132 in an appropriate format.

The motion event configuration interface 134 is preferably a visual interface displayed on a screen to allow a user to configure all motion event providers 132 installed on the system 120. The exemplary interface 134 also provides access to the motion web site 136 where new motion media and motion event providers 132 may be downloaded and installed.

As will be described in more detail below, the configuration options allowed by the interface 134 include the ability to enable/disable event providers 132 and map motion media to particular events supported by each provider 132. The interface 134 also provides access to the motion web site 136, allowing for new motion media and motion event providers 132 to be downloaded and installed onto the current system.

Each motion event provider 132 contains a visual configuration control 158 that allows the user to configure the events supported by each provider 132. The exemplary configuration controls 158 use the media view control object 156 to gain access to the available motion media in the motion media file 144 that can be mapped to each available event.

These controls may also be configured to allow the user to add new, customized events to the motion event providers 132. The dynamic events can be defined using parameters such as text (usernames, messages, email, etc.), date/time, or any other parameter particular to an event providers event source.

The media view control object 156 provides access to all installed motion media scripts as represented by the motion media file 144. Preferably, the media view control object 156 displays a conventional browse/select dialog to allow identification and selection of the available motion media. This object 156 is used by the event provider configuration controls 158 and allows the configuration controls 158 to remain independent of the motion media format.

The media creation tool application 138 allows the user to customize and/or create motion media. This application 138 preferably implements a graphical, easier to use, front-end user interface design.

The motion web site 136 provides a location for the user to download new motion media as well as new and/or updated motion event providers 132. The motion media is preferably stored in a single meta file. New motion media downloaded from the motion web site 136 will be added to this meta file.

The present invention is preferably embodied using the Windows registry; typically, a component category is created for each of the motion event providers 132, allowing the motion event manager 130 to enumerate all providers 132 installed on the system. Primary event sources 132 are user actions (in any active application supported via a motion event provider) and operating system tasks.

With the foregoing understanding of the modules that form the exemplary system 120, various scenarios in which these modules typically interact will now be described.

Figure 2:
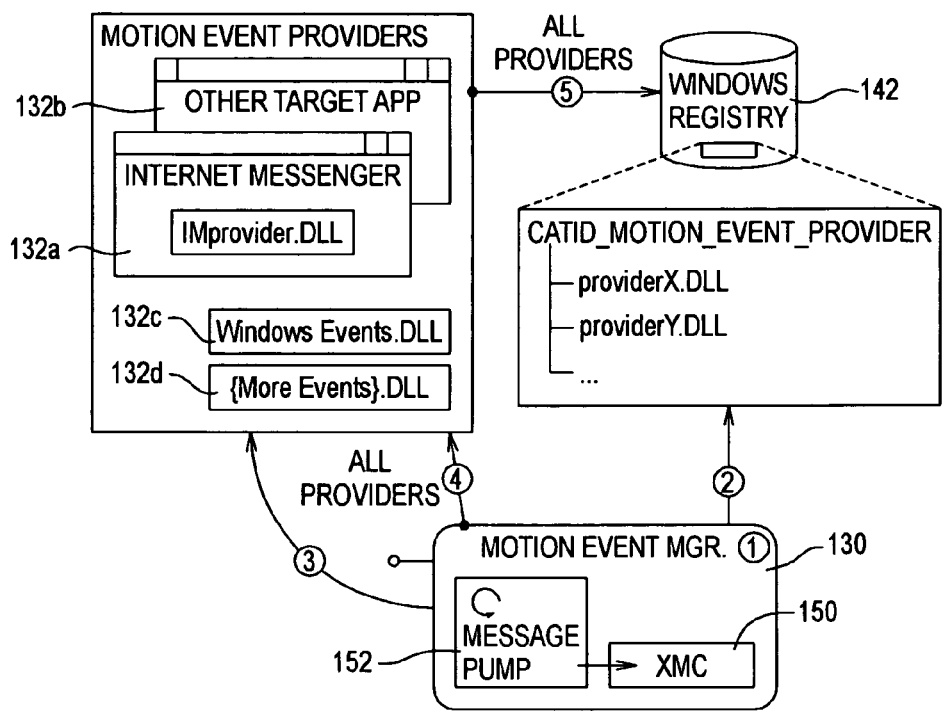
FIG. 2 is a scenario map depicting the startup and initialization of the system of FIG. 1.

Referring now to FIG. 2, depicted therein is the scenario describing the startup process of the motion event manager 130 of the system 120. Each of the steps of this startup process will now be described with reference to FIG. 2.

The motion event manager 130 process 130 begins on system startup. The motion event manager 130 process 130 next queries the MOTION_EVENT_PROVIDER component category in the Windows Registry to enumerate all motion event providers 132 installed on the system.

Third, the registry entry of each of the event providers 132 contains startup information indicating if the particular event provider is either a standard in-proc provider or a specialty provider that is injected into a target process to monitor event conditions.

Fourth, the motion event manger 130 creates a new instance of each provider 132. If the event provider 132 is a specialty provider that is injected into a target application process, the event manger 130 will read the target-process information from the provider's registry entry, find the target process, and perform the DLL-injection. If the target process is not active, the motion event manager 130 will continually monitor the creation of new applications, and perform the injection when/if the requested application is launched.

Fifth, once the event providers 132 are created, the motion event manager 130 will send the appropriate initialization information to each provider 132, including callback information to allow the event providers 132 to post event messages back to the event manager 130.

Finally, the event provider 132 reads initialize message data and establish the necessary event syncs to monitor the events. The initialize message data includes a registry key identifying the location of the event configurations and preferences as last set by the motion event configuration interface 134 or the default installed set.

Figure 3:
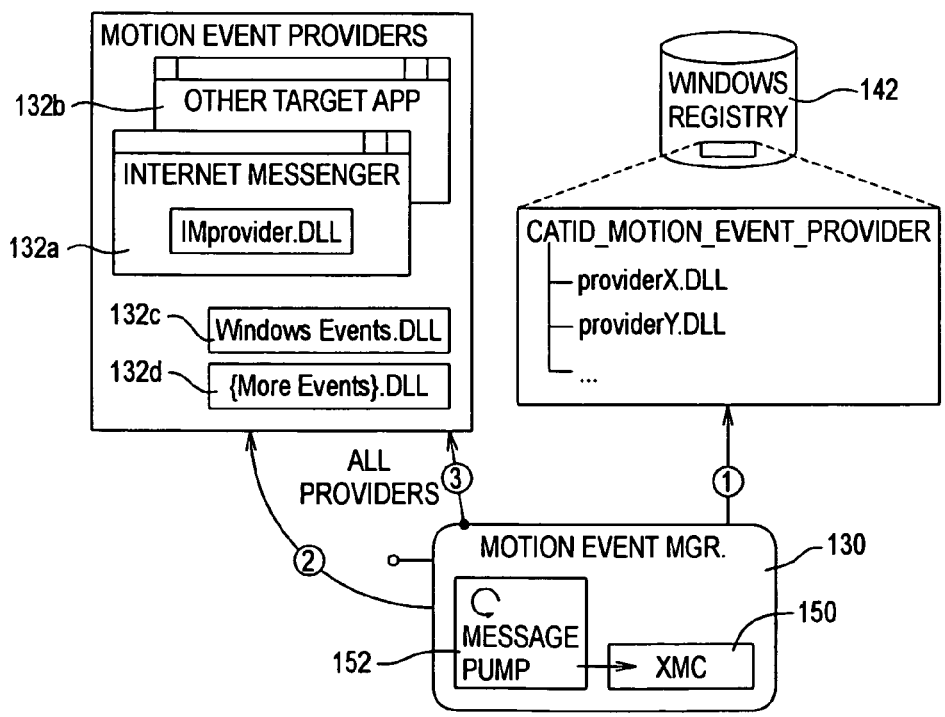
FIG. 3 is a scenario map depicting the process of injecting a motion event provider DLL into the address space of a target application.

Referring now to FIG. 3, depicted therein is the DLL injection scenario map. This scenario describes the process of injecting a motion event provider DLL into the address space of a target application.

As shown in FIG. 3, the first step of this process is for the motion event manager 130 to determine which process into which the motion event provider 132 must be injected based on the registry entry of the provider 132.

Once the target process has been identified, the next step is for the event manager 130 to install a Windows message hook in the target process. This causes the event provider DLL to be loaded into the target address space of the target process. The event provider DLL has now been loaded into the required process, and will now wait for the "initialize" message from the motion event provider 132.

Figure 4:
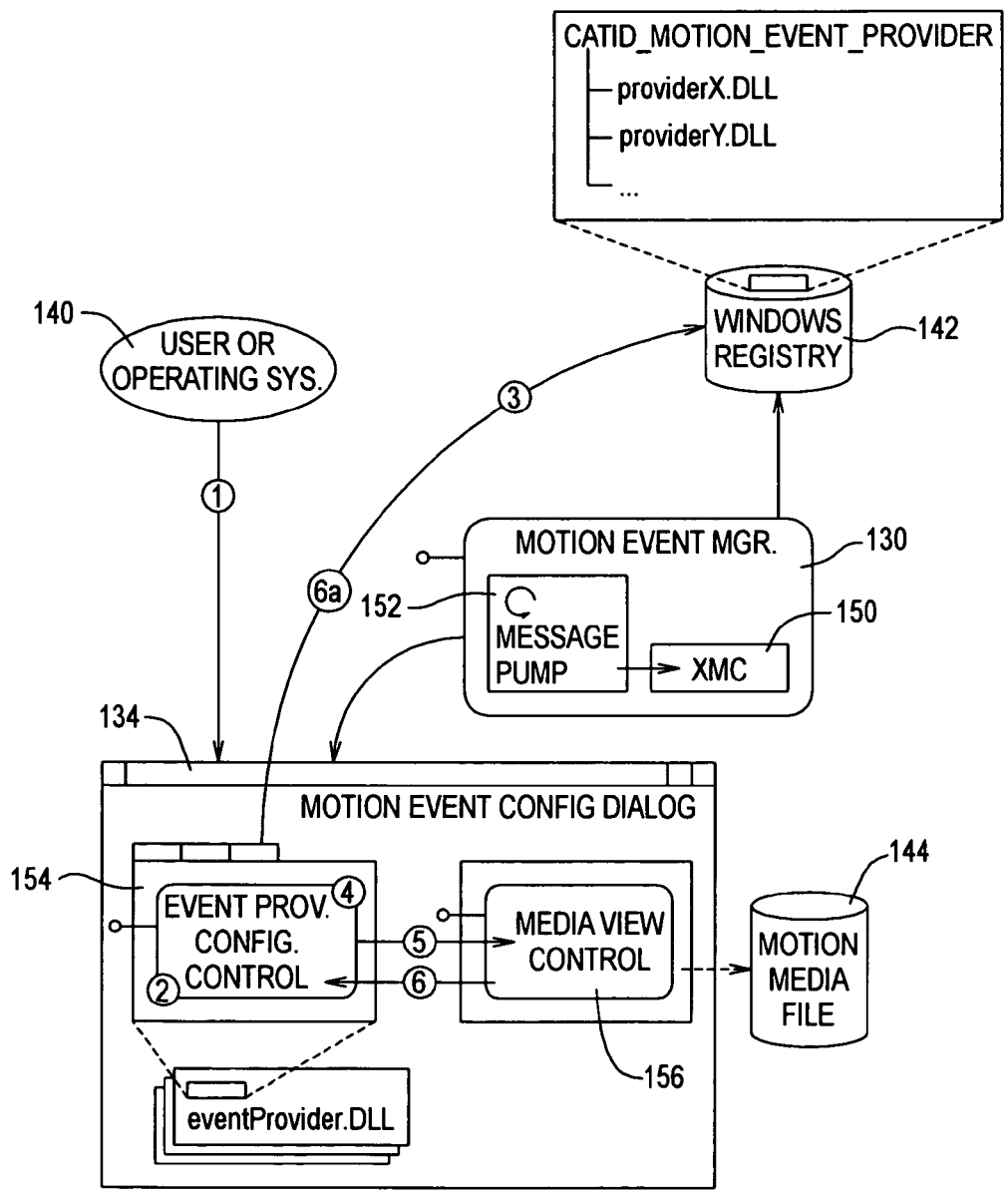
FIG. 4 is a scenario map depicting the process of configuring motion events provided by each of one or more motion event providers 132.

Referring now to FIG. 4, depicted therein is the motion event configuration scenario map. This scenario map describes the process of configuring motion events of each of the motion event providers 132.

First, the user launches the motion event configuration interface 134 from system tray interface of the motion event manager 130.

Each event provider object 132 supports a custom visual control 154 that can be used to edit the object's supported events. The event configuration interface 134 creates and hosts these visual controls 154 for the user.

Next, when the event provider configuration control 154 is created and initialized, it will receive the location in the Windows Registry 142 of its persisted event data, which will be loaded into the control 154.

Next, the user will select an event provider 132 to configure. Individual events may be mapped to motion actions, and particular events (as well as the entire event provider itself) may be deactivated if desired. As noted above, these event configuration controls 154 may also provide the means to add additional, customized events based on input user parameters (custom text strings, buddy chat names, email messages, etc).

When the user selects an event to configure, the event provider configuration control 154 will defer to the media view control object 156. The media view control object 156 displays all available motion media via a dialog box, allowing the user to make a selection.

Finally, once the user makes a motion media selection, the media view control object 156 returns data back to the event provider configuration control object 154 (including human-readable description text of the event for display as well as a data token which can later be used to identify media selection). The configuration control object 154 then persists this information to the Windows Registry 142.

Figure 5:
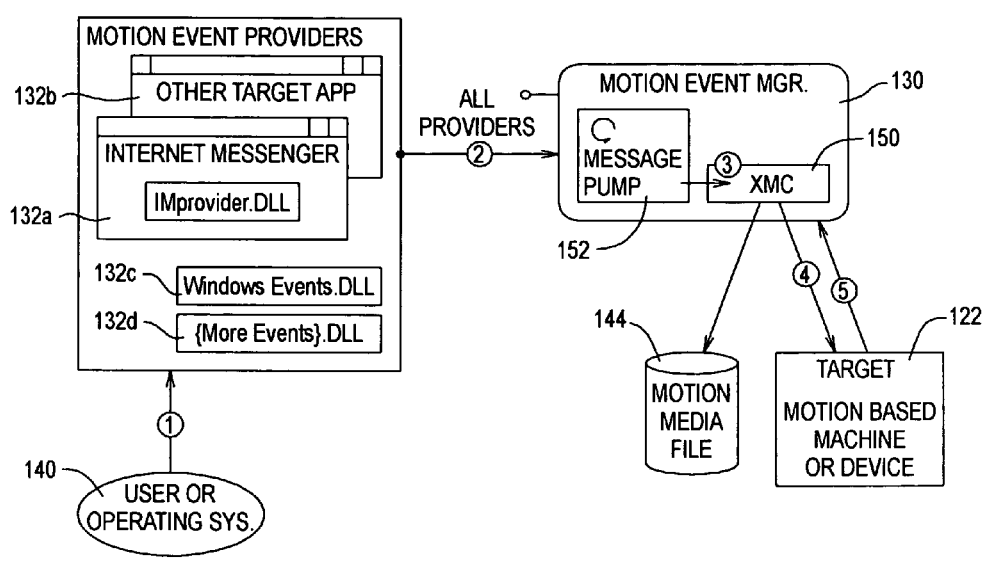
FIG. 5 is a scenario map depicting the process of handling a motion event.

Referring now to FIG. 5, depicted therein is a motion event scenario map. This scenario describes the process of handling a motion event.

The scenario depicted in FIG. 5 begins whenever an event occurs. The occurrence of an event may be caused from a user action, operating system event, or an event situation monitored in a third-party application.

The event provider 132 then fires a event token associated with this event to the event manager 130. The event token has previously been stored in the registry during the event configuration process. If the provider 132 requires queried data to be returned, the provider 132 will also pass the necessary callback data to the event manager 130.

The event manager 130 next receives the event and passes the requested media information to the motion control component 150. The motion control component 150 then executes the specified motion media on the target motion device 122.

Finally, if a query action was requested, the motion control component 150 will return the appropriate data. The motion event manger 130 will send the data through the specified event provider callback mechanism.

Figure 6:
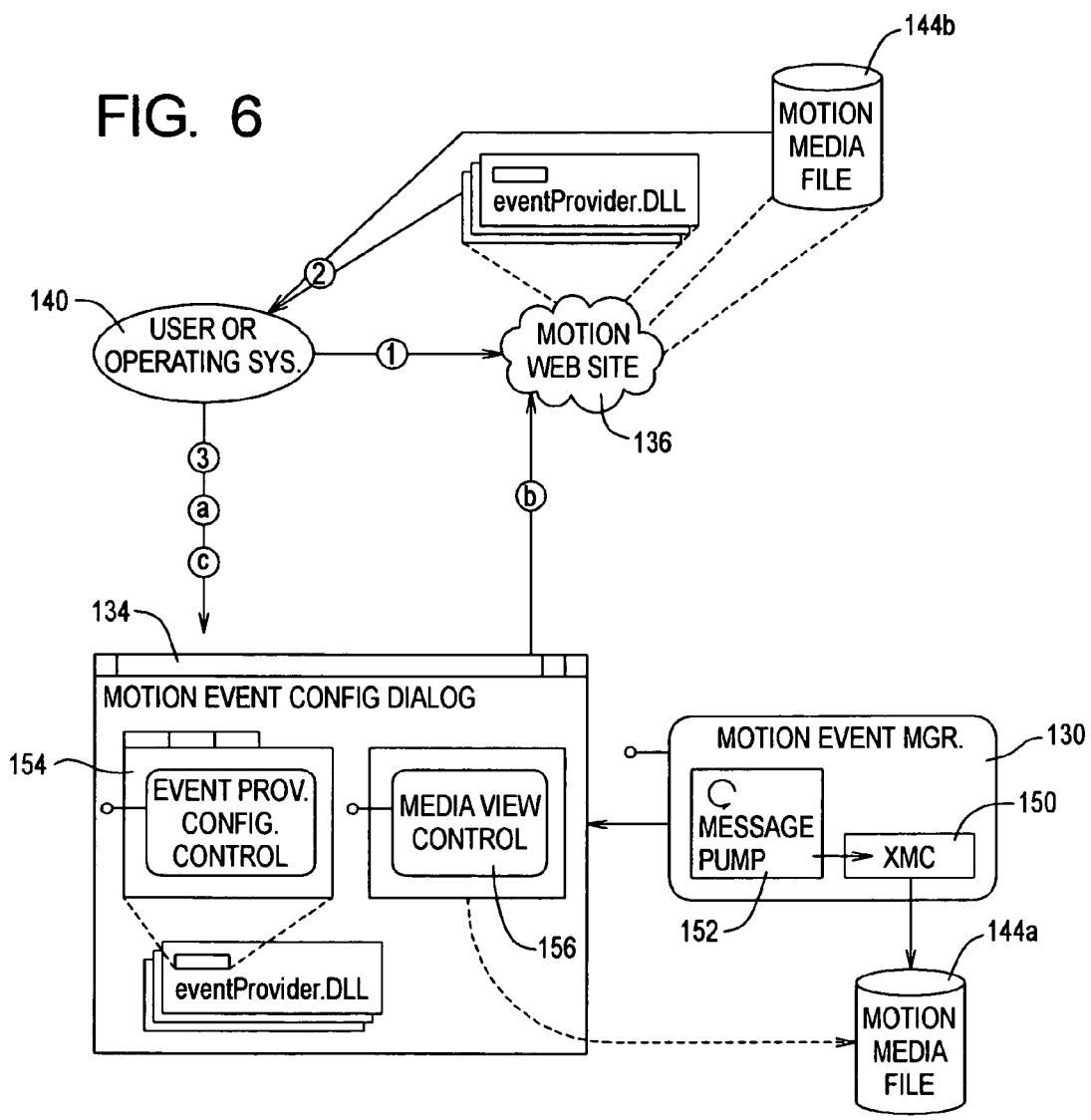
FIG. 6 is a scenario map depicting how a user may obtain new motion media and motion event providers 132 from the motion web site 136.

Depicted in FIG. 6 is a motion web site scenario map. The scenario of FIG. 6 describes how a user may obtain new motion media and motion event providers 132 from the motion web site 136.

This process may be started when users visit the motion web site 136 to browse currently available motion event providers 132 and new motion media. In FIG. 6, the reference character 144a is used to represent a motion media file stored locally by the system 120, while the reference character 144 represents a motion media file stored at a remote location.

Next, the user selects the desired provider/media download option, and the new software is installed into the motion event manager 130 including the motion control component 150.

The next time the motion event configuration interface 134 is launched, the user will be able to configure the new event provider 132 or motion media in the local motion media file 144a.

Alternatively, users may download new event providers 132 and motion media directly from within the motion event Configuration dialog interface. This configuration dialog will provide the following options to the user: Download new Motion Media and/or Download/install new motion event providers 132. The user or the motion event manager 130 may also check for new versions of currently installed motion media and/or event providers 132.

Next, the user selects the desired provide/media download or update option, and the configuration dialog interface object 134 automatically downloads and installs the new software from the media web site 136.

Finally, once the new software is installed the configuration dialog 134 will automatically update to provide access to the new components and/or media.

Figure 7:
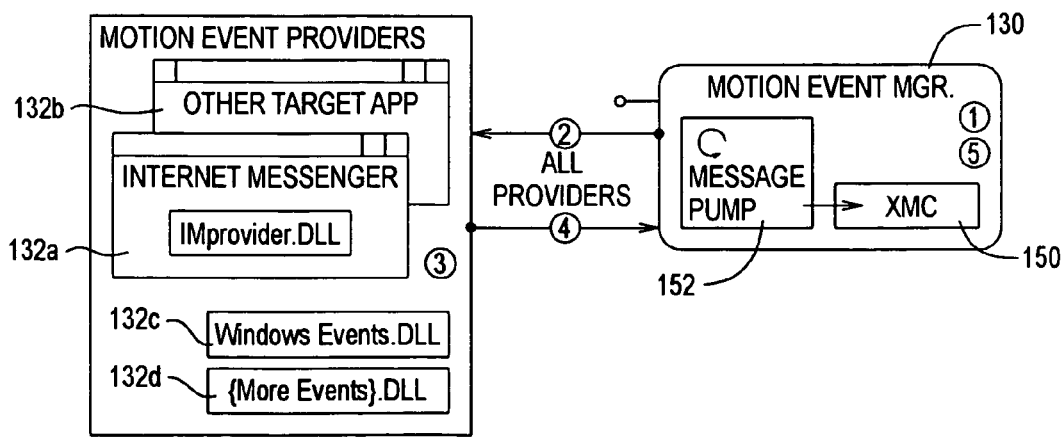
FIG. 7 is a scenario map depicting shut down of the system of FIG. 1.

Referring now to FIG. 7, depicted therein is the system shutdown scenario map. This scenario describes the process of shutting down the exemplary event manager module 130 associated with the motion control component 150.

Upon operating system shutdown, the motion event manager 130 will prepare to terminate.

The event manager 130 next posts a shutdown message to each event provider 132 currently being managed by the manager 130. Specialty event providers 132 that have been injected into external processes may have already finished if the target process has been shutdown. In this case those event providers 132 would have already notified the event manager 130 that they are no longer available.

Each event provider 132 performs any required shutdown tasks.

Upon finishing any shutdown tasks, each provider 132 will notify the event manager 132 that the provider 132 is now finished.

Once the event manager 130 receives notifications that each of the event providers 132 managed thereby have been shutdown, the event manager 130 itself is now finished.

Figure 8:
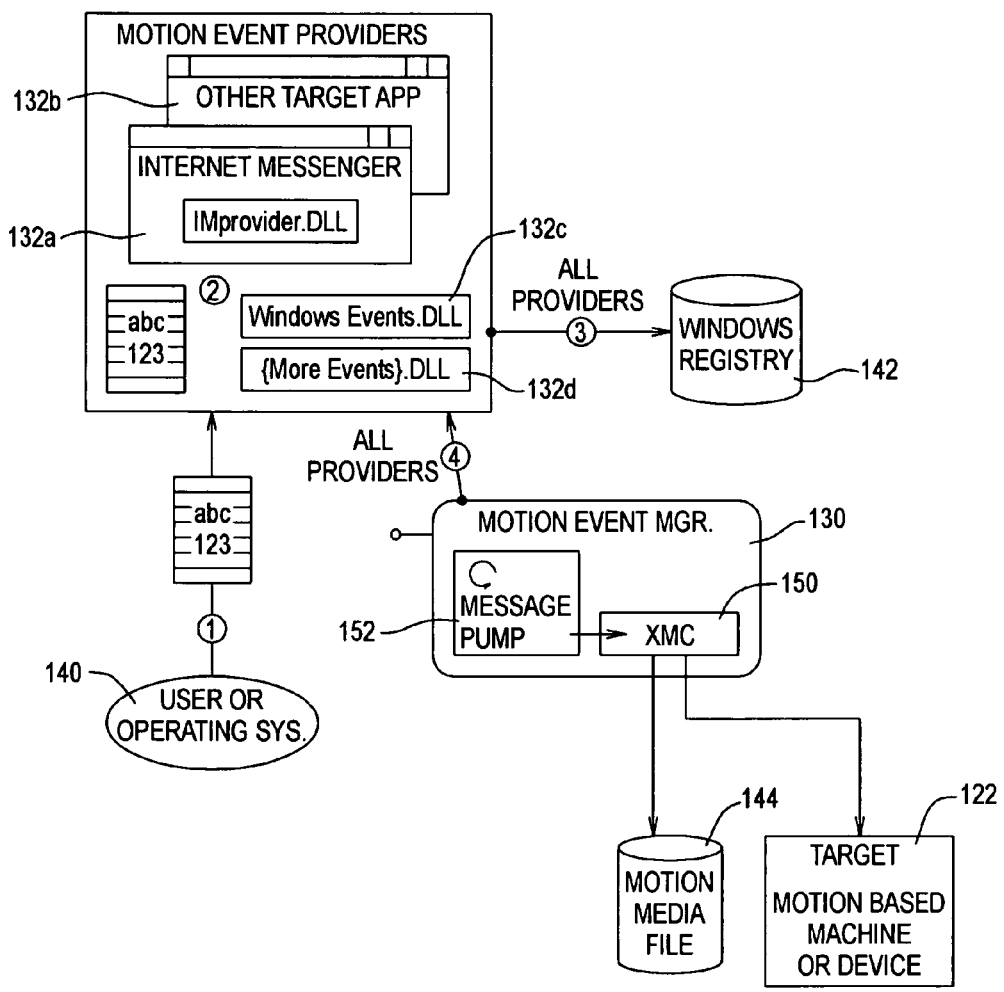
FIG. 8 is a scenario map depicting the mapping of text to motion events.

Referring now to FIG. 8, depicted therein is a scenario map illustrating the mapping of text to motion events. This scenario generally describes the mapping of text based event situations to motion.

The first step of this process is for a text based event situation to occur. This text could be one or more of the following: (a) a particular sub-string in an Instant Message or the entire message string itself; (b) an Instant Message sent from a target screen or 'buddy' name; (c) a text string converted from a speech-to-text engine installed on the user's machine; and/or (d) an email message meeting previously configured criteria (Sent From, Subject, message content, etc). In the case of an event created using a peer-to-peer networked application such as Instant Messenger-type process, text is entered at a remote source application and sent as a text message to a receiving application.

The motion event provider 132 monitoring the specific text based event catches the event, and performs any pre-processing of the text required to identify the particular event. In the peer-to-peer application described above, a DLL functioning as the event provider 132 is injected into the receiving application; the DLL event provider 132 intercepts the message received by the receiving application and treats the received message as an event.

Once an event has been identified, the event provider 132 will lookup the corresponding motion event token as previously configured. As generally described above, the motion event tokens are pre-loaded upon initialization. In the peer-to-peer example described above, the DLL functioning as the event provider 132 sends the text message as part of the event token to the event manager 130 using a process-to-process communication system as generally described above.

After the event token containing the text message is sent to the motion event manager 130, the event manager 130 determines the type of event represented by the received token.

If the event manager 130 determines that the received event token corresponds to a text event, the event manager 130 next parses the text parameter from the event token. The motion event manager 130 looks up the motion media associated with the event type and event text parameter. The appropriate motion media is then sent to the motion control component 150 for execution on the target motion device 122 as described above with reference to FIG. 5.

The process described above with reference to FIG. 8 can also occur in the reverse. In particular, the event manager 130 uses the motion control component 150 to continually query the target device 122 for state information. When the state information meets certain parameters, the control component 150 causes the event manager to 'create' a new event (such as a text event) and send it to an event provider 132.

The event provider 132 in turn then causes the receiving application to sent a message to a remote peer-to-peer application; again, the receiving and remote peer-to-peer applications may be Instant Messenger compatible applications.

An example of the use of the present system to verify motion status would be for the event manager 130 to continually or periodically query the target device 122 through the motion control component 150 for status parameters that indicate a fault condition. Once a fault condition occurs, the event manager 130 builds a text message that describes the fault and then sends the text message to a remote application, such as an Instant Messenger user, using process-to-process communication system and the peer-to-peer networked application.

The following Table A describes the interface specifications for components of the exemplary motion control system 120 described above using the exemplary motion control component 150.

TABLE A

| component | interface | method(s)/description |
|---|---|---|
| motion event manager 30 | IXMCEventProviderMgt | EnumerateProviders used by configuration dialog object to get a list of all installed motion event providers 132 EnableProvider( ) used to enable/disable given event providers. will be called from the configuration dialog object |
| | IXMCEventScheme | GetSchemes( ) used by configuration dialog object to get current list of schemes on the system AddScheme( ) - used by configuration dialog object to add a new scheme RemoveScheme( ) - used by configuration dialog object to remove a given scheme RenameScheme( ) - used by configuration dialog object to rename a given scheme |
| Event configuration controls 158 | IXMCEventConfig | Initialize( ) - called by the configuration dialog object which hosts this control, used to pass required init data, such as 1) current registry location where event configuration data may be loaded/persisted, 2) interface to the media view control 156, etc . . . |
| Media View Control 156 | IXMCMediaViewCtrl | method: SelectMedia( ) - called by each event configuration control. This method will display a dialog to visualize all motion media available on the system and return a tokenized data param that can later identify the media item selected |

In the following discussion, the details of a number of the exemplary components of the system 120 will now be described.

The Windows Registry 142 is used to persist event management with motion control configuration data.

Data associated with the motion event providers 132 is persisted to the Windows Registry 142 primarily to accommodate event provider DLLs that need to be injected into a target process, an environment where those DLLs may not be able to rely on standard COM storage alternatives.

At runtime, when the motion event manager 130 initializes an event provider, the provider will receive a location in the registry where it should read its previously configured event data.

At design time, when hosted within the motion event configuration interface 134, the event configuration controls 156 of the event providers 132 receive the registry location, and will persist configuration changes to that location.

Event providers will persist both standard (hard coded) and custom events to their registry storage location. Associated with each event will be the configured motion event token data, which the provider will use when firing event notifications back to the motion event manager 130.

The motion event manager 130 manages all registry locations for the event provider objects.

The event manager provides a mechanism to support different event schemes. This allows configurations unique for several different users, situations, or motion devices. When a new scheme is selected via the motion event configuration interface 134, the event manager 130 will pass the new scheme registry location to each event provider object 132, allowing access to the new scheme data. Each scheme will be located in a unique sub key under the primary event manager registry location.

The user interface components 154 and 156 of the system 120 may be implemented in many different forms. The motion event configuration control 154 is used to configure all motion event providers 132 installed on the system, as well as to provide access to the motion web site 136 where new motion media and motion providers may be downloaded and installed. The interface of the media creation tool 138 is a preferably graphical representation of the motion device or system, where simple drag-drop, click, and record operations will facilitate the creating and modification of motion media.

The system 120 is designed to be easily extendible via new motion event provider and motion media components. The system 120 is also capable of supporting any number of additional event sources with the addition of new motion event providers 132 by registering these new providers with the system 120. These event providers 132 can link to virtually any event source to a target system 122.

The motion media formats can be modified and extended without requiring changes to any event provider objects. For example, a XMCMediaCtrl object proxies the raw motion media format to the event providers. Accordingly, once the XMCMediaCtrl component is updated to handle any new media formats, the event providers 132 may, by design, make use of the changes.

Instead of triggering entire motion programs as described above with reference to FIG. 6, a motion program or media set may be streamed to the device 122 through the system 120. Whether or not and how the media plays may be controlled by captured events. For example, a media player may fire events based on different musical notes or tones. When such events are received, one media stream may be selected over another, thus causing the motion device 122 to perform different actions. This may also occur with the standard motion programs described above.

Very large motion programs may be downloaded in partial form and then either downloaded in full over time or as certain specified events occur in the system.

Similar to streaming media support, single motion operations may also be supported in which a specified event causes a single motion operation to take place immediately. One example of this would be an event that causes movement of one axis in the clockwise direction.

The present invention may be embodied in forms other than those described above. The scope of the present invention should thus be determined with reference to the following claims and not the foregoing exemplary detailed description.

We claim:

1. A motion control system for controlling a selected target device from a group of supported target devices to perform a desired motion operation from a set of supported motion operations that can be performed by the supported target devices, comprising:
   a motion event configuration interface for associating source dependent events with source independent event tokens, where
      each event token is associated with at least one hardware independent motion command, and
      each hardware independent motion command is associated with at least one of the desired motion operations;

at least one motion event provider configured to generate at least one event token upon the occurrence of at least one event;

a motion event manager for receiving the at least one event token generated by the at least one motion event provider; and a motion control component adapted to
generate device-specific control commands for the selected target device based on the at least one hardware independent motion command associated with the at least one event token received by the motion event manager, and
transmit the device-specific control commands to the selected target device to cause the selected target device to perform the desired motion operation.

2. A motion control system as recited in claim 1, in which the motion event configuration interface further comprises an event provider configuration control for identifying the at least one event associated with each event token.

3. A motion control system as recited in claim 1, in which the motion event configuration interface further comprises a media view control for associating event tokens with hardware independent motion commands.

4. A motion control system as recited in claim 1, in which:
the hardware independent motion command is a media command; and
the motion control component generates at least one device-specific control command based on the media command.

5. A motion control system as recited in claim 1, in which:
the hardware independent motion command associated with the event token corresponds to at least one of a media command and a device-specific control command; and
the motion control component further operates in a pass-through mode in which the motion control device transmits at least one device-specific control command defined by the event token to the selected target device.

6. A motion control system as recited in claim 1, in which the motion event configuration interface further comprises:
an event provider configuration control for identifying the at least one predetermined event associated with each event token; and
a media view control for associating event tokens with hardware independent motion commands.

7. A motion control system as recited in claim 1, in which:
the event token further comprises a text message; and
the motion event manager further parses the event token to extract the text message, where the text message identifies the hardware independent motion command associated with the event token.

8. A motion control system as recited in claim 1, in which the at least one event is the receipt of a message by a receiving application of a peer-to-peer communications system.

9. A motion control system as recited in claim 1, in which:
the motion control component determines a status of the selected target device; and
the motion event manager queries the motion control component to determine the status of the selected target device and sends to the at least one motion event provider a status message based on the status of the selected target device.

10. A motion control system as recited in claim 1, in which the motion event manager stores associations between at least some of the event tokens and at least some of the hardware independent motion commands and sends to the motion control component the hardware independent motion command associated with at least some of the event tokens received by the motion event manager.

11. A motion control system as recited in claim 1, further comprising a system registry, where associations of source dependent events and source independent event tokens are persisted in the system registry.

12. A motion control system as recited in claim 1, in which the event provider configuration control allows configuration of associations of source dependent events and source independent event tokens.

13. A motion control system as recited in claim 1, in which the event provider configuration control allows parameters associated with associations of source dependent events and source independent event tokens to be altered.

14. A motion control system as recited in claim 1, in which each source dependent event is associated with an event provider, and the event provider configuration control allows selection of at least one event provider.

15. A motion control system for controlling a selected target device from a group of supported target devices to perform a desired motion operation from a set of supported motion operations that can be performed by the supported target devices, comprising:
at least one event provider for generating at least one event associated with the desired motion operation;
a motion event configuration interface for associating events with event tokens where the motion event configuration interface allows selection of the at least one event provider;
at least one motion event provider configured to generate at least one event token upon the occurrence of at least one event; and
a motion event manager for receiving the at least one event token generated by the at least one motion event provider; and
a motion control component adapted to
generate device-specific control commands for the selected target device based on the at least one event token received by the motion event manager, and
transmit the device-specific control commands to the selected target device to cause the selected target device to perform the desired motion operation.

16. A motion control system for controlling a selected target device from a group of supported target devices to perform a desired motion operation from a set of supported motion operations that can be performed by the supported target devices, comprising:
at least one event provider, where each event provider generates at least one event and each event is associated with an event token;
a motion event configuration interface for selecting at least one event provider;
at least one motion event provider configured to generate at least one event token upon the occurrence of at least one event; and
a motion event manager for receiving the at least one event token generated by the at least one motion event provider; and
a motion control component adapted to
generate device-specific control commands for the selected target device based on the at least one event token received by the motion event manager, and
transmit the device-specific control commands to the selected target device to cause the selected target device to perform the desired motion operation.

* * * * *